UNITED STATES PATENT OFFICE.

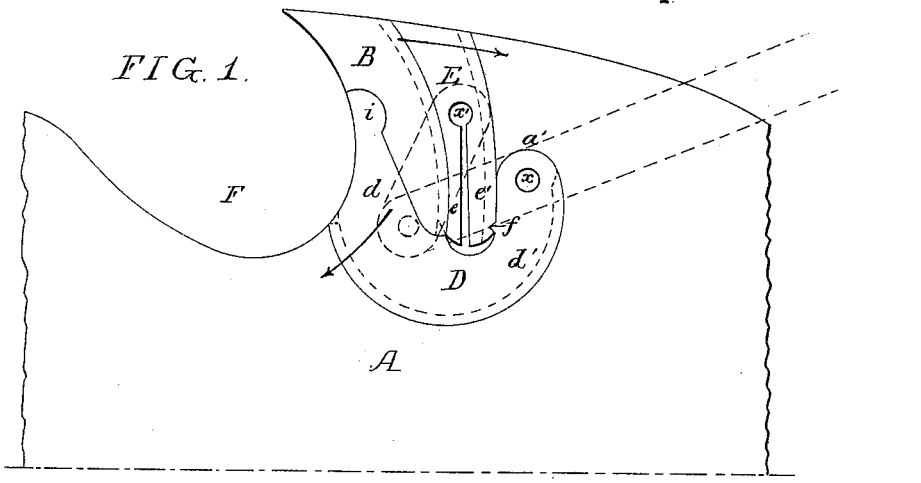

JOHN SMITH, OF PHILADELPHIA, PENNSYLVANIA, ASSIGNOR TO HAMILTON DISSTON, HORACE C. DISSTON, WILLIAM DISSTON, AND JACOB S. DISSTON, ALL OF SAME PLACE.

SAW WITH INSERTIBLE TEETH.

SPECIFICATION forming part of Letters Patent No. 326,798, dated September 22, 1885.

Application filed June 19, 1885. (No model.)

*To all whom it may concern:*

Be it known that I, JOHN SMITH, a citizen of the United States, residing in Philadelphia, Pennsylvania, have invented certain Improvements in Saws, of which the following is a specification.

The main object of my invention is to securely lock insertible teeth to the body of a saw, so that there will be no danger of the teeth being accidentally forced out of place when the saw is in operation.

In the accompanying drawings Figure 1 is a view of my insertible saw-tooth and its retaining-plates in position in the body of the saw; Fig. 2, a perspective view of the different parts detached. Fig. 3 is a modification.

In the present instance, A is the body of the saw; B, the tooth; D, the front locking-plate, and E the locking-wedge, which is fitted between the rear of the tooth and the body of the saw.

To secure the tooth so that it cannot accidentally be thrown out when the saw is in operation, and at the same time to leave the gullet free to be cut out to any desired depth, I form a recess, $a$, at the rear of the gullet F, and adapt a rearwardly-extending locking-plate, D, thereto, as shown in Fig. 1. The edge of the recess is provided with a V-shaped rib, fitting a corresponding groove on the periphery of the locking-plate D, and when the latter is in place its end $d'$ finds a bearing against the body of the saw at $a'$. This locking-plate has a recess formed by and between the two arms $d\ d'$, a projection, $i$, on the arm $d$ fitting into a recess, $i'$, in the tooth B. The tooth B is tapered, as shown, and has at the rear a V-shaped groove, into which fits a V-shaped rib on the wedge E. This wedge is also grooved to receive a rib formed on the body of the saw. The thin end of the wedge is split, and is formed into two legs, $e\ e'$. When in place, this wedge E firmly secures the tooth and locking-plate in position. The thrust on the tooth is taken, as shown by the arrows, where both the wedge and locking-plate are the strongest, the projecting lug $i$ forming a pivot for the tooth and dividing the thrust, as shown. In some cases it is advisable to form a projection, $f$, on the arm $d'$ of the locking-plate D, which will, when the wedge is inserted, adapt itself to a recess formed in the leg $e'$ of the wedge, thus holding the wedge securely in place. The wedge can be forced in and out to fasten or release the tooth by the lever of the construction shown by dotted lines in Fig. 1.

In the modification shown in Fig. 3 the wedge forms part of the tooth, and the projection $i$ on the locking-plate D is dispensed with; but I prefer the construction shown in Fig. 1.

I claim as my invention—

1. The combination of the body of the saw having a segmental recess at the rear of the gullet, the tooth B, and the locking-plate fitted to said segmental recess, and having two arms, $d\ d'$, between which the lower portion of the tooth is contained, as set forth.

2. The combination of the body of the saw having a recess at the rear of the gullet, a locking-plate fitted to said recess, a tooth, B, the lower portion of which projects into a recess in the locking-plate, and a wedge, E, at the rear of the tooth, whereby said tooth is retained in the recess of the locking-plate, as specified.

3. The combination of the body of a saw, the tooth, the wedge at the rear of the latter, and the locking-plate adapted to a segmental recess in the body of the saw, said plate extending upward in the rear of the wedge and having a projection, $f$, adapted to a recess therein, as specified.

4. The combination of the body of a saw having a segmental recess in the rear of the gullet, a tooth, B, having a recess, $i$, in its front edge, and a locking-plate adapted to the segmental recess in the saw, said plate extending upward in the rear of the tooth and having in front a projection, $i$, adapted to the recess $i'$ of said tooth, as specified.

In testimony whereof I have signed my name to this specification in the presence of two subscribing witnesses.

JOHN SMITH.

Witnesses:
HENRY HOWSON,
HARRY SMITH.